US012719072B2

(12) United States Patent
Goto et al.

(10) Patent No.: US 12,719,072 B2
(45) Date of Patent: Aug. 25, 2026

(54) VEHICLE

(71) Applicant: TOYOTA JIDOSHA KABUSHIKI KAISHA, Toyota (JP)

(72) Inventors: Takeshi Goto, Toyota (JP); Yoshihiko Hiroe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 606 days.

(21) Appl. No.: 18/214,743

(22) Filed: Jun. 27, 2023

(65) Prior Publication Data

US 2024/0014426 A1 Jan. 11, 2024

(30) Foreign Application Priority Data

Jul. 5, 2022 (JP) ................................ 2022-108551

(51) Int. Cl.

| | |
|---|---|
| ***H01M 8/18*** | (2006.01) |
| ***B60L 7/10*** | (2006.01) |
| ***B60L 58/12*** | (2019.01) |
| ***B60L 58/40*** | (2019.01) |
| ***H01M 8/04537*** | (2016.01) |
| ***H01M 8/04858*** | (2016.01) |
| ***H01M 16/00*** | (2006.01) |

(52) U.S. Cl.

CPC ............... *H01M 8/186* (2013.01); *B60L 7/10* (2013.01); *B60L 58/12* (2019.02); *B60L 58/40* (2019.02); *H01M 8/04567* (2013.01); *H01M 8/04947* (2013.01); *H01M 16/006* (2013.01); *H01M 2250/20* (2013.01)

(58) Field of Classification Search

CPC ............. H01M 8/186; H01M 8/04567; H01M 8/04947; H01M 16/006; B60L 7/10; B60L 58/12; B60L 58/40; B60L 7/26; B60L 50/75; B60L 58/27; B60L 7/18

See application file for complete search history.

(56) References Cited

U.S. PATENT DOCUMENTS

| | | | | |
|---|---|---|---|---|
| 2004/0205032 | A1* | 10/2004 | Routtenberg ........... | B60L 58/30 429/430 |
| 2016/0359214 | A1* | 12/2016 | Barton ................ | H01M 8/0656 |
| 2020/0331353 | A1* | 10/2020 | Nanba ..................... | B60L 50/70 |
| 2021/0188068 | A1 | 6/2021 | Yoshizumi et al. | |
| 2023/0075054 | A1* | 3/2023 | Haas ....................... | B60L 58/40 |

FOREIGN PATENT DOCUMENTS

| | | |
|---|---|---|
| JP | H11-113105 A | 4/1999 |
| JP | 2001-204105 A | 7/2001 |
| WO | 2017/130080 A1 | 8/2017 |

* cited by examiner

*Primary Examiner* — Stewart A Fraser

(74) *Attorney, Agent, or Firm* — Dinsmore & Shohl LLP

(57) ABSTRACT

A vehicle includes: a power storage device; a regenerative fuel cell including a water electrolysis device and a fuel cell; a motor generator configured to be driven using electric power of at least one of the power storage device and the fuel cell; a driving wheel configured to be driven by the motor generator; and a control device configured to perform regeneration control of generating regenerative electric power by the motor generator at a time of braking of the vehicle. The control device is configured to supply the regenerative electric power to the water electrolysis device when an SOC of the power storage device is equal to or greater than a predetermined value at a time of performing the regeneration control.

7 Claims, 3 Drawing Sheets

V
MG
30
50
40
PCU
20
ECU
CPU
MEMORY
200
201
202
60
L
R2
R3
R1
R4
R5
90
70
FC
71
WATER ELECTROLYSIS DEVICE
72
H
74
O
75
W
73
BAT
10
11
140
130
110
120
150
151
111
100

VEHICLE

CROSS-REFERENCE TO RELATED APPLICATION

This application claims priority to Japanese Patent Application No. 2022-108551 filed on Jul. 5, 2022, incorporated herein by reference in its entirety.

BACKGROUND

1. Technical Field

The present disclosure relates to a vehicle.

2. Description of Related Art

WO 2017/130080 discloses a technique of controlling an electric motor such that the electric motor generates electric power at the time of braking in a vehicle having a battery mounted therein or the like and supplying the generated electric power (regenerative electric power) to a battery with a lower residual capacity out of a first battery and a second battery.

SUMMARY

In the technique described in WO 2017/130080, an amount of electric power stored in one or more batteries out of a plurality of batteries can be prevented from being depleted by switching a battery to be supplied with regenerative electric power according to a state of charge of each battery.

However, when a plurality of batteries ("a first battery and a second battery") is fully charged, the batteries cannot be charged with the regenerative electric power. There is demand for recovering regenerative electric power even when the batteries are fully charged and improving recovery efficiency of regenerative energy.

The present disclosure provides a vehicle that can enable reception of regenerative electric power even when a power storage device (battery) mounted in the vehicle is fully charged and improve recovery efficiency of regenerative energy.

A vehicle according to a first aspect of the present disclosure includes a power storage device, a regenerative fuel cell including a water electrolysis device and a fuel cell, a motor generator configured to be driven using electric power of at least one of the power storage device and the fuel cell, a driving wheel configured to be driven by the motor generator, and a control device configured to perform regeneration control of generating regenerative electric power by the motor generator at a time of braking of the vehicle. The control device is configured to supply the regenerative electric power to the water electrolysis device when a state of charge (SOC) of the power storage device is equal to or greater than a predetermined value at a time of performing the regeneration control.

With this configuration, the control device of the vehicle generates electric power using the motor generator at the time of braking of the vehicle and may recover regenerative electric power (regenerative energy) by performing regeneration control. The control device may supply the regenerative electric power to the water electrolysis device when the SOC of the power storage device is equal to or greater than the predetermined value and, for example, when the SOC is close to a fully charged state and no more regenerative electric power is received. Since the water electrolysis device can generate oxygen and hydrogen by electrolyzing water using the supplied regenerative electric power, it is possible to recover the regenerative electric power as fuel for the fuel cell and to improve recovery efficiency of regenerative energy.

In the vehicle according to the first aspect of the present disclosure, the regenerative fuel cell may include a hydrogen tank and an oxygen tank, and the control device may be configured not to supply the regenerative electric power to the water electrolysis device when the hydrogen tank of the regenerative fuel cell is fully filled with hydrogen or when the oxygen tank of the regenerative fuel cell is fully filled with oxygen.

With this configuration, when the hydrogen tank is fully filled with hydrogen or when the oxygen tank is fully filled with oxygen, supply of regenerative electric power to the water electrolysis device may not be performed. Accordingly, when the tanks are in a fully filled state and it would be difficult to charge the tanks with hydrogen or oxygen even if hydrogen or oxygen were generated, hydrogen and oxygen may not be generated by the water electrolysis device and thus it is possible to protect the regenerative fuel cell. The expression "fully filled" may exhibit a filled state in which there is no empty space in the tanks and it is substantially difficult to store hydrogen or oxygen even if hydrogen or oxygen is generated by the water electrolysis device.

In the vehicle according to the first aspect of the present disclosure, the power storage device may include a lithium-ion battery, and the control device may be configured to charge the power storage device by supplying the regenerative electric power to the power storage device in a range of a charging current and to supply a remaining regenerative electric power to the water electrolysis device when the SOC of the power storage device is less than the predetermined value. The range of the charging current may be a range in which lithium is not deposited in the lithium-ion battery due to charging with the regenerative electric power. The remaining regenerative electric power may be the regenerative electric power which is not supplied to the power storage device.

When the lithium-ion battery is charged, lithium ions may be deposited as lithium metal (deposition of lithium) on the surface of a negative electrode. Particularly, when high-rate charging (large-current charging) is performed at a low temperature of the lithium-ion battery, deposition of lithium may occur.

With this configuration, when the SOC of the power storage device is less than the predetermined value and the power storage device can receive regenerative electric power, the power storage device may be charged with the regenerative electric power in the range of the charging current in which lithium is not deposited in the lithium-ion battery due to charging with the regenerative electric power. The remaining regenerative electric power not supplied to the power storage device (not used to charge the power storage device) may be supplied to the water electrolysis device. Accordingly, it is possible to receive regenerative electric power using the power storage device and the water electrolysis device while curbing deposition of lithium in the power storage device (the lithium-ion battery) and to improve recovery efficiency of regenerative energy.

In the vehicle according to the first aspect of the present disclosure, the range in which lithium is not deposited in the lithium-ion battery may be calculated using a magnitude of the charging current supplied to the power storage device, a charging time, and a temperature of the power storage device.

The vehicle according to the first aspect of the present disclosure may further include a temperature raising device configured to raise a temperature of the power storage device using waste heat of the regenerative fuel cell. The control device may be configured to operate the temperature raising device when the temperature of the power storage device is equal to or lower than a set temperature.

The lithium-ion battery may cause deposition of lithium with a smaller charging current at a lower temperature. With this configuration, when the temperature of the lithium-ion battery is equal to or lower than the set temperature, the temperature raising device raising the temperature of the lithium-ion battery may be operated using waste heat of the regenerative fuel cell. Accordingly, the temperature of the lithium-ion battery can be raised, the charging current can be increased because the deposition of lithium is less likely to occur, and an amount of electric power charged by the lithium-ion battery can be increased. Thus, it is possible to improve recovery efficiency of regenerative energy.

In the vehicle according to the first aspect of the present disclosure, the temperature raising device may be a temperature-adjusting water passage including a water passage and a first heat exchanger.

With this configuration, since waste heat of the regenerative fuel cell can be used in the temperature-adjusting water passage, it is possible to raise the temperature of the lithium-ion battery with a relatively simple configuration.

In the vehicle according to the first aspect of the present disclosure, a coolant may flow in the water passage, the temperature raising device may include a second heat exchanger, and the coolant may exchange heat with the regenerative fuel cell at the first heat exchanger and exchange heat with the power storage device at the second heat exchanger.

The vehicle according to the first aspect of the present disclosure may further include a photovoltaic power generation device. The control device may be configured to supply electric power generated by the photovoltaic power generation device to at least one of the power storage device and the water electrolysis device.

According to the present disclosure, it is possible to enable reception of regenerative electric power even when a power storage device mounted in a vehicle is fully charged and to improve recovery efficiency of regenerative energy.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
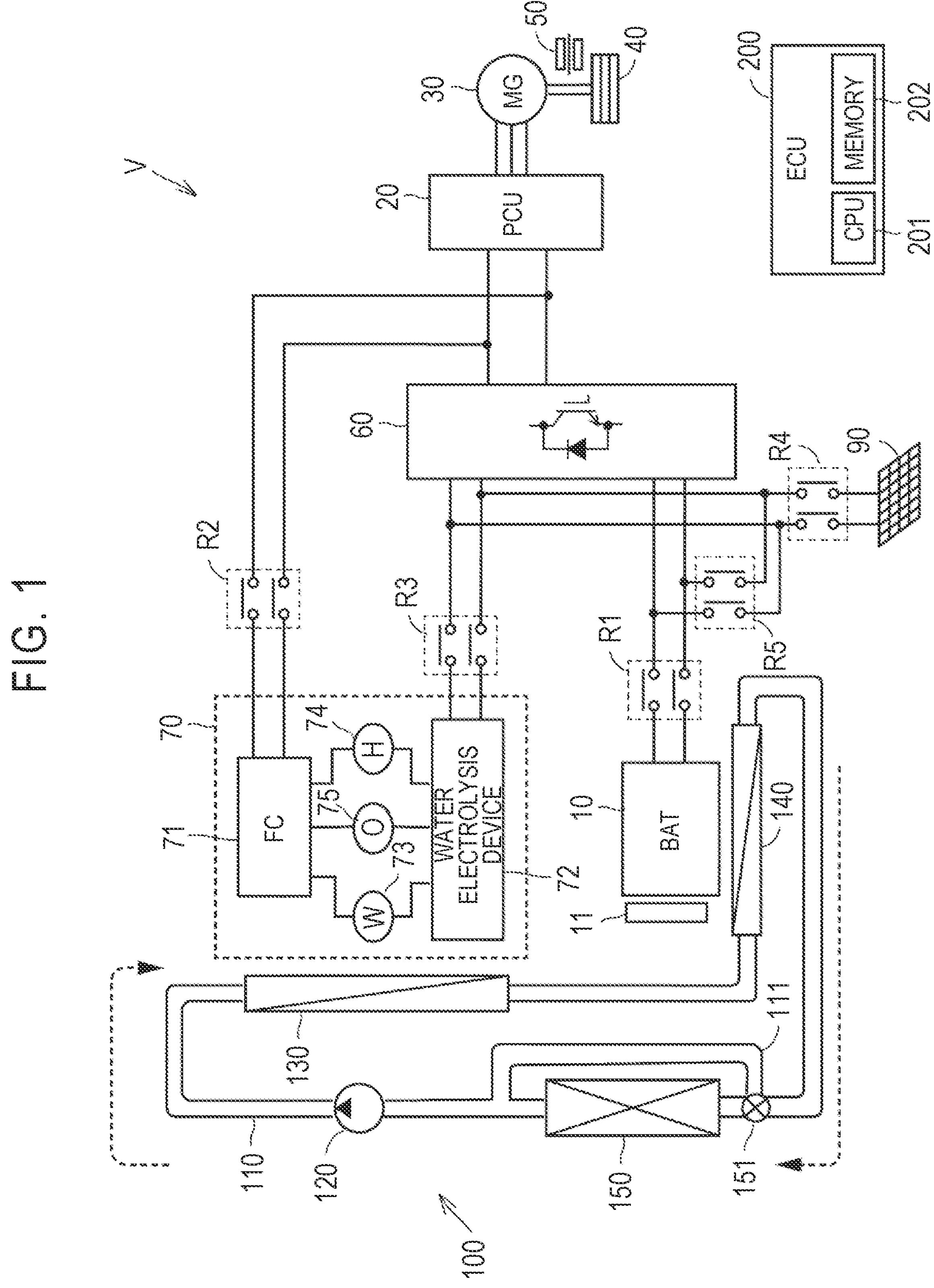
FIG. 1 is a diagram schematically illustrating a configuration of a vehicle according to an embodiment.

Hereinafter, an embodiment of the present disclosure will be described in detail with reference to the accompanying drawings. In the following embodiment, the same or corresponding elements will be referred to by the same reference signs in the drawings and description thereof will not be repeated.

FIG. 1 is a diagram schematically illustrating a configuration of a vehicle V according to an embodiment. In this embodiment, the vehicle V is. for example, a lunar rover (a lunar vehicle) traveling on the lunar ground. The vehicle V includes a battery (a power storage device) 10, a power control unit (PCU) 20, a motor generator (MG) 30, and a driving wheel 40. In FIG. 1, one motor generator (MG) 30 and one driving wheel 40 are depicted. However, the vehicle V may include two or more motor generators (MG) 30 and two or more driving wheels 40.

The battery 10 is a battery pack in which stacks in which a plurality of single cells (cells) is stacked are connected in series. A single cell is a rechargeable lithium-ion battery. A monitoring unit 11 including a current sensor, a voltage sensor, and a temperature sensor is provided in the battery 10. The monitoring unit 11 is constituted by, for example, an electronic control unit (ECU). Information such as an input/output current of the battery 10 (a battery current) IB, a temperature of the battery 10 (a battery temperature) TB, and a voltage of the battery 10 (a battery voltage) VB is acquired by the monitoring unit 11. The monitoring unit 11 calculates a state of charge (SOC) of the battery based on a current method and/or SOC-open-circuit voltage (SOC-OCV) characteristics. The SOC of the battery 10 may be calculated by a control ECU 200 which will be described later.

The PCU 20 is a drive device that drives the MG 30 using electric power stored in the battery 10 and electric power generated by a fuel cell 71 which will be described later. The battery 10 and the PCU 20 can be electrically connected and disconnected via a relay R1. In this embodiment, the PCU 20 is constituted by, for example, a DC/DC converter and an inverter (not illustrated). The DC/DC converter steps up a DC voltage of the battery 10 and supplies the stepped-up DC voltage to the inverter. The inverter is a three-phase inverter, converts DC electric power supplied from the battery 10 to AC electric power, and drives the MG 30. The inverter converts AC electric power regenerated by the MG 30 to DC electric power and supplies the DC electric power to the battery 10 via the DC/DC converter. The DC/DC converter may be omitted.

The MG 30 generates power for allowing the vehicle V to travel by receiving AC electric power from the PCU 20. The MG 30 is an AC rotary electric machine and is, for example, a permanent magnet synchronous motor including a rotor in which a permanent magnet is embedded. The power of the MG 30 is transmitted to the driving wheel 40. On the other hand, when the vehicle V decelerates or when the vehicle V stops, the MG 30 converts kinetic energy of the vehicle V to electric energy and generates electric power (generates regenerative electric power). The AC regenerative electric power generated by the MG 30 is converted to DC electric power by the PCU 20 (inverter) and is supplied to the battery 10 and a water electrolysis device 72 which will be described later. In this way, the MG 30 is configured to generate a driving force or a braking force of the vehicle V with transmitting and receiving of electric power.

A service brake (a mechanical brake) 50 is provided in the vehicle V, and a braking force from the service brake 50 in addition to the regenerative braking force from the MG 30 can be applied at the time of braking the vehicle V.

A regenerative fuel cell (RFC) 70 is mounted in the vehicle V. The RFC 70 includes a fuel cell 71, a water electrolysis device 72, a water tank 73, a hydrogen tank 74, and an oxygen tank 75. The fuel cell 71 is, for example, a solid polymer fuel cell and generates electric power using hydrogen stored in the hydrogen tank 74 and oxygen stored in the oxygen tank 75. DC electric power generated by the fuel cell 71 is supplied to the PCU via a relay R2. Water generated when the fuel cell 71 generates electric power is stored in the water tank 73.

The water electrolysis device 72 generates hydrogen and oxygen by electrolyzing water stored in the water tank 73. Hydrogen generated by the water electrolysis device 72 is stored in the hydrogen tank 74, and oxygen generated by the water electrolysis device 72 is stored in the oxygen tank 75.

The water electrolysis device 72 and the PCU 20 can be electrically connected and disconnected via a relay R3 and can be supplied with regenerative electric power generated by the MG 30. The water electrolysis device 72 is connected to a photovoltaic power generation device 90 via a relay R4. When the relay R3 and the relay R4 are closed (connected), electric power generated by the photovoltaic power generation device 90 is supplied to the water electrolysis device 72. The photovoltaic power generation device 90 is connected to the battery 10 via a relay R5 provided downstream from the relay R4. When the relay R1, the relay R4, and the relay R5 are closed (connected), electric power generated by the photovoltaic power generation device 90 can be stored in the battery 10.

A power distribution mechanism 60 is provided between the PCU 20 and the battery 10 (the relay R1) and the water electrolysis device 72 (the relay R3). The power distribution mechanism 60 is a device that distributes regenerative electric power generated by the MG 30 to the battery 10 and the water electrolysis device 72 and controls the magnitudes of regenerative electric power (distributed amounts) supplied to the battery 10 and the water electrolysis device 72. The power distribution mechanism 60 includes, for example, a plurality of switching elements and may control the magnitudes of regenerative electric power supplied to the battery 10 and the water electrolysis device 72 by controlling duty ratios of the switching elements. The power distribution mechanism 60 includes a variable resistor and may control the magnitudes of regenerative electric power supplied to the battery 10 and the water electrolysis device 72 by controlling a resistance value thereof. The power distribution mechanism 60 includes a bypass circuit, and electric power supplied from the battery 10 to the PCU 20 is not controlled by the power distribution mechanism 60. A temperature-adjusting water passage 100 is provided in the vehicle V.

The temperature-adjusting water passage 100 is a temperature raising device that recovers waste heat of the RFC 70 and raises the temperature of the battery 10 using the waste heat of the RFC 70. The temperature-adjusting water passage 100 includes a water passage 110, a pump 120, an RFC heat exchanger 130, a battery heat exchanger 140, and a radiator 150. When the pump 120 is activated, a coolant in the water passage 110 flows in the order of the RFC heat exchanger 130, the battery heat exchanger 140, and the radiator 150. The coolant flowing in the water passage 110 exchanges heat with the RFC 70 to receive waste heat of the RFC 70 at the RFC heat exchanger 130. In the battery heat exchanger 140, the coolant exchanges heat with the battery 10 to dissipate heat and to raise the temperature of the battery 10.

When the temperature of the coolant is low, a thermostat 151 is closed, and the coolant flows in a bypass passage 111 and returns to the pump 120. When the temperature of the coolant is high, the thermostat 151 is open, and the coolant is cooled (dissipates heat) at the radiator 150 and then returns to the pump 120.

The vehicle V further includes a control ECU 200. The control ECU 200 corresponds to a "control device" in the present application. The control ECU 200 controls the relays R1 to R5, the PCU 20, the power distribution mechanism 60, the RFC 70, the pump 120, and the like. The control ECU 200 includes a central processing unit (CPU) 201, a memory 202, and an input/output port (not illustrated). The memory 202 includes a read only memory (ROM) and a random access memory (RAM) and stores a program which is executed by the CPU 201 or the like. The CPU 201 performs a predetermined arithmetic operation based on various signals input from the input/output port, information acquired from the monitoring unit 11, and information stored in the memory, and controls the relays R1 to R5, the PCU 20, the power distribution mechanism 60, the RFC 70, the pump 120, and the like based on results of the arithmetic operation.

When a state of charge (SOC) of the battery 10 is high and the battery 10 is close to a fully charged state, charging of the battery 10 causes overcharging. Accordingly, when the SOC of the battery 10 is high, the battery 10 cannot be charged with regenerative electric power generated by the MG 30 and recovery efficiency of regenerative energy decreases. The battery 10 is a lithium-ion battery, and deposition of lithium may occur particularly when the battery 10 is charged with regenerative electric power at a high rate (a large current) at a low temperature.

In this embodiment, the recovery efficiency of regenerative electric power (regenerative energy) is improved by supplying the regenerative electric power generated by the MG 30 to the water electrolysis device 72 in addition to the battery 10.

Figure 2:
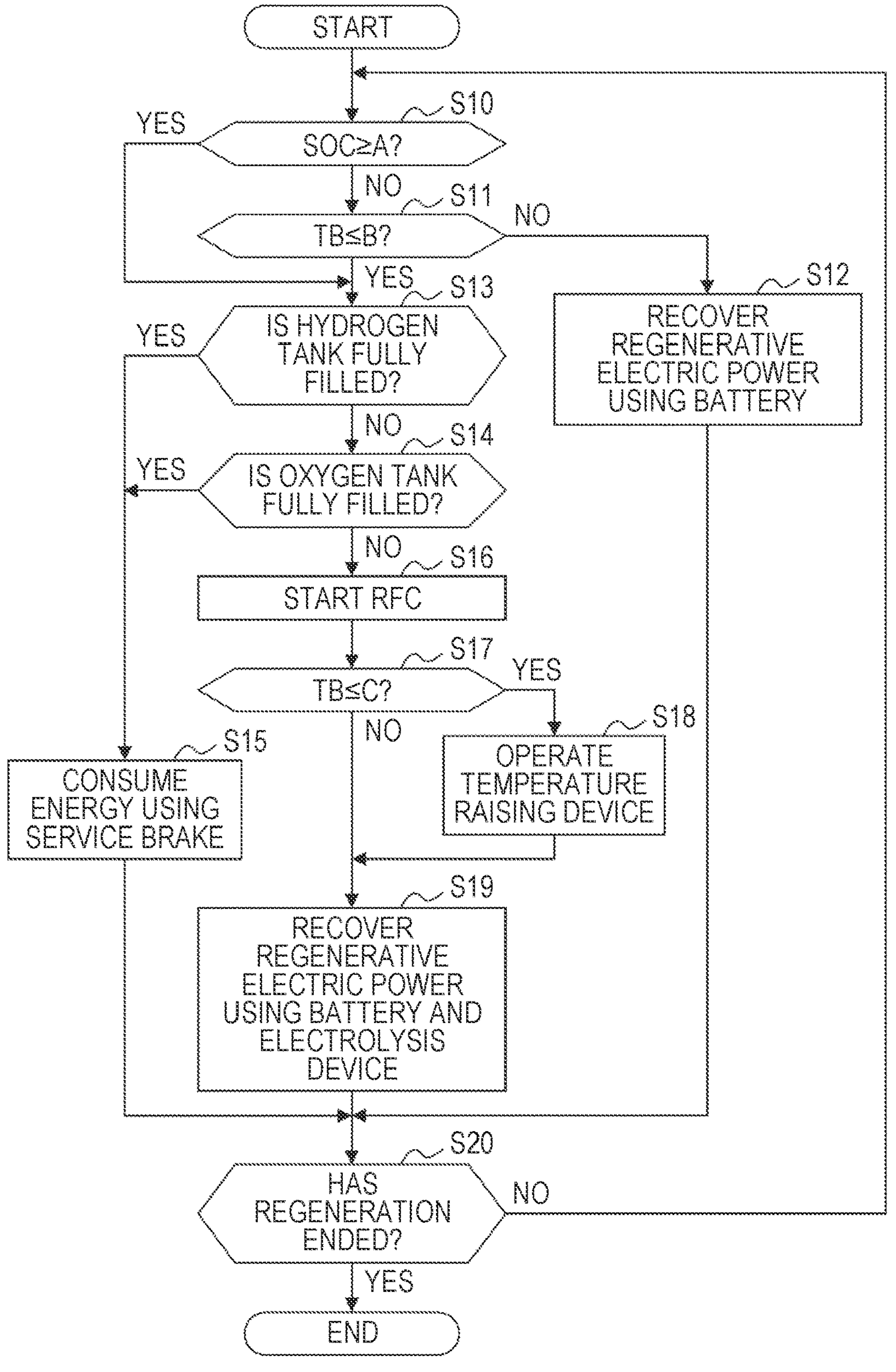
FIG. 2 is a flowchart schematically illustrating regeneration control which is performed by a control ECU.

FIG. 2 is a flowchart schematically illustrating regeneration control that is performed by the control ECU 200. This flowchart is performed when generation of regenerative electric power is started by the MG 30. The flowchart may be performed when it is predicted to travel on a downhill road in a preset traveling route. The control ECU 200 performs control such that the MG 30 operates as a power generator to generate regenerative electric power when a braking operation is performed on the vehicle V.

In Step (hereinafter, Step is abbreviated to "S") 10, it is determined whether the SOC of the battery 10 is equal to or greater than a predetermined value A. The predetermined value A has only to be a value at which the battery 10 can be considered to be in a fully charged state and may be, for example, 85%. When the SOC is equal to or greater than the predetermined value A, the determination result is positive and the routine proceeds to S13. When the SOC is less than the predetermined value A, the determination result is negative and the routine proceeds to S11.

In S11, it is determined whether the battery temperature TB is equal to or less than a predetermined value B. The predetermined value B is a temperature at which deposition of lithium occurs when the battery temperature TB decreases to this temperature or lower at the time of charging of the battery 10 and is set by experiment or the like in advance. When the battery temperature TB is greater than the predetermined value B, the determination result is negative and the routine proceeds to S12. When the battery temperature TB is equal to or less than the predetermined value B, the determination result is positive and the routine proceeds to S13.

In S12, since the battery 10 is not in the fully charged state and deposition of lithium does not occur even if charging with regenerative electric power is performed, the regenerative electric power is recovered by the battery 10 by charging the battery 10 with the regenerative electric power. At this time, the power distribution mechanism 60 is controlled such that the relay R1 is closed and all the regenerative electric power generated by the MG is supplied to the battery 10.

In S13, it is determined whether the hydrogen tank 74 is fully filled with hydrogen. For example, when an inner pressure of the hydrogen tank 74 is equal to or greater than a predetermined value, it is determined that the hydrogen tank 74 is fully filled. The routine proceeds to S15 when the determination result of S13 is positive, and the routine proceeds to S14 when the determination result of S13 is negative.

In S14, it is determined whether the oxygen tank 75 is fully filled with oxygen. For example, when an inner pressure of the oxygen tank 75 is equal to or greater than a predetermined value, it is determined that the oxygen tank 75 is fully filled. The routine proceeds to S15 when the determination result of S14 is positive, and the routine proceeds to S16 when the determination result of S14 is negative.

In S15, braking of the vehicle V is performed by the service brake 50, and kinetic energy of the vehicle V is consumed as thermal energy of the brake. Since there is a likelihood that charging with regenerative electric power will cause deposition of lithium when the battery temperature TB is equal to or less than the predetermined value B and electrolysis of water in the water electrolysis device 72 is difficult when the hydrogen tank 74 and the oxygen tank 75 are fully filled, braking using the service brake 50 as a main operator (deceleration of the vehicle V) is performed.

In S16, the RFC 70 starts its operation. For example, the RFC 70 operates by opening the valves of the water tank 73, the hydrogen tank 74, and the oxygen tank 75, or the like. Operation of the fuel cell 71 may be started according to necessity.

Subsequently, in S17, it is determined whether the battery temperature TB is equal to or less than a set temperature C. The set temperature C is a temperature for determining that the temperature of the battery 10 is a very low temperature and is a value lower than the temperature corresponding to the predetermined value B. For example, the set temperature C may range from −30° C. to −20° C. When the battery temperature TB is equal to or less than the set temperature C, the determination result is positive and the routine proceeds to S18. When the battery temperature TB is greater than the set temperature C, the determination result is negative and the routine proceeds to S19.

In S18, the temperature-adjusting water passage 100 operates to raise the temperature of the battery 10 by driving the pump 120. After S18 has been performed, the routine proceeds to S19.

In S19, regenerative electric power generated by the MG 30 is recovered using the battery 10 and the water electrolysis device 72. The relay R1 and the relay R3 are closed and the power distribution mechanism 60 is controlled such that the regenerative electric power is supplied to the battery 10 and the water electrolysis device 72. At this time, the control ECU 200 controls the power distribution mechanism 60 such that deposition of lithium does not occur in the battery 10 due to the regenerative electric power (charging electric power) supplied to the battery 10.

Figure 3:
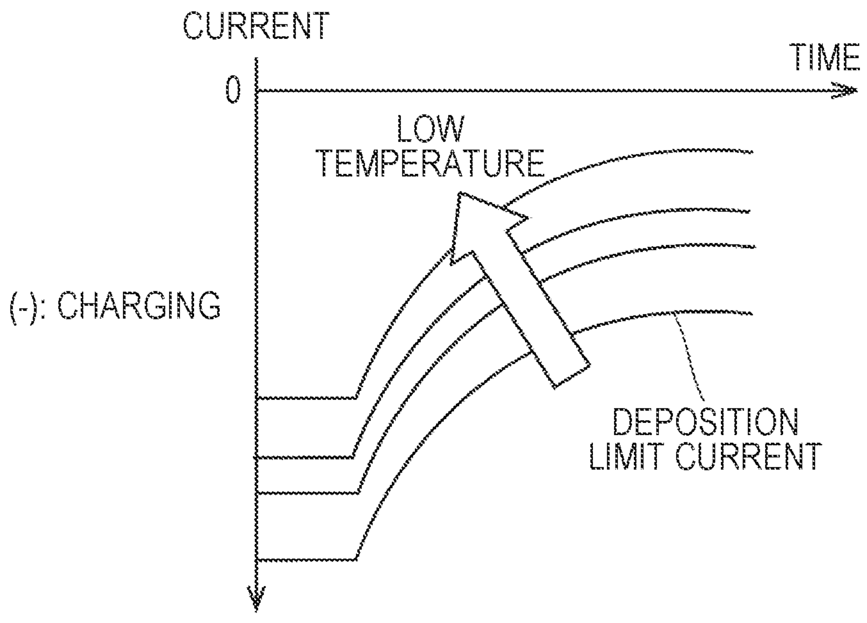
FIG. 3 is a map illustrating a relationship between a charging current and a charging time when deposition of lithium occurs in a battery.

FIG. 3 is a map illustrating a relationship between a charging current and a charging time when deposition of lithium occurs in the battery 10. This map can be obtained by experiment or the like in advance. In FIG. 3, the vertical axis represents the magnitude of the charging current, and the horizontal axis represents the charging time. The charging current increases as it goes in the negative direction. When the charging current is equal to or greater than a deposition limit current illustrated in FIG. 3, deposition of lithium occurs in the battery 10. The deposition limit current decreases with the elapse of the charging time. The deposition limit current decreases when the battery temperature TB becomes lower.

The control ECU 200 calculates the deposition limit current from the map illustrated in FIG. 3 based on the battery temperature TB and the charging time. Then, the control ECU 200 controls the power distribution mechanism 60 such that regenerative electric power supplied to the battery 10 satisfies the charging current less than the deposition limit current illustrated in FIG. 3. Then, the control ECU 200 controls the power distribution mechanism 60 such that the remaining regenerative electric power not supplied to the battery 10 (electric power obtained by subtracting the electric power supplied to the battery 10 from the regenerative electric power generated by the MG 30) is supplied to the water electrolysis device 72. For example, when the regenerative electric power generated by the MG 30 is defined as Rm and the regenerative electric power supplied to the battery 10 is defined as Rb, the regenerative electric power of "Rm−Rb" is supplied to the water electrolysis device 72. Accordingly, since the battery 10 is charged with the regenerative electric power and the water electrolysis device 72 generates hydrogen and oxygen by electrolyzing water using the regenerative electric power, it is possible to efficiently recover the regenerative electric power.

The magnitude of regenerative electric power supplied to the battery 10 may vary according to the determination result of S17. For example, when the determination result of S17 is negative (when "battery temperature TB>set temperature C" is satisfied), the regenerative electric power supplied to the battery 10 is controlled such that the charging current becomes 95% of the deposition limit current acquired from the map illustrated in FIG. 3. When the determination result of S17 is positive (when "battery temperature TB≤set temperature C" is satisfied), the regenerative electric power supplied to the battery 10 is controlled such that the charging current becomes 60% of the deposition limit current acquired from the map illustrated in FIG. 3.

By controlling the regenerative electric power supplied to the battery 10 in this way, it is possible to charge the battery 10 having high responsiveness in outputting of electric power (discharging) with more regenerative electric power when "battery temperature TB>set temperature C" is satisfied. When "battery temperature TB≤set temperature C" is satisfied, the regenerative electric power supplied to the water electrolysis device 72 increases and thus waste heat (generated heat) of the RFC 70 (the water electrolysis device 72) increases, whereby it is possible to promote raising of the temperature of the battery 10.

Subsequently, in S20, it is determined whether generation of electric power (regeneration) using the MG 30 has ended. When regeneration has not ended, the determination result is negative and the routine returns to S10. When regeneration has ended, this routine ends.

According to this embodiment, the control ECU 200 supplies regenerative electric power to the water electrolysis device 72 when the SOC of the battery 10 is equal to or greater than the predetermined value A and approaches the fully charged state and the battery 10 cannot be charged with the regenerative electric power. Since the water electrolysis device 72 can generate oxygen and hydrogen by electrolyzing water using the supplied regenerative electric power, it is possible to recover the regenerative electric power as fuel of the fuel cell 71 and to improve the recovery efficiency of regenerative energy.

According to this embodiment, when the hydrogen tank 74 of the RFC 70 is fully filled with hydrogen or when the oxygen tank 75 is fully filled with oxygen, supply of regenerative electric power to the water electrolysis device 72 is not performed. In this embodiment, the expression "fully filled" exhibits a filled state in which there is no empty space in the tanks and it is substantially difficult to store hydrogen or oxygen even if hydrogen or oxygen is generated by the water electrolysis device 72. Accordingly, when it is difficult to charge the tanks with hydrogen or oxygen even if hydrogen or oxygen is generated, hydrogen and oxygen is not generated by the water electrolysis device 72 and thus it is possible to protect the RFC 70.

According to this embodiment, when the SOC of the battery 10 is less than the predetermined value A and the battery temperature TB is greater than the predetermined value B (the determination result of S11 is negative), deposition of lithium does not occur in spite of charging with regenerative electric power and thus the battery 10 is charged with the regenerative electric power (S12). Even when there is a likelihood that deposition of lithium will occur due to charging of the battery 10, the battery 10 is charged with the regenerative electric power in the range of the charging current in which lithium is not deposited in the battery 10 due to charging with the regenerative electric power using the deposition limit current acquired form the map illustrated in FIG. 3, and the remaining regenerative electric power not supplied to the battery 10 is supplied to the water electrolysis device 72. Accordingly, the regenerative electric power can be supplied to both the battery 10 and the water electrolysis device 72 while curbing deposition of lithium in the battery 10 and it is possible to improve recovery efficiency of regenerative energy.

According to this embodiment, when the battery temperature TB is equal to or less than the set temperature C, the temperature-adjusting water passage 100 (the temperature adjusting device) operates to raise the temperature of the battery 10 using waste heat of the RFC 70. Since the deposition limit current can be increased by raising the temperature of the battery 10 and the charging electric power for the battery 10 can be increased, it is possible to improve recovery efficiency of regenerative energy.

In the aforementioned embodiment, a lunar rover is assumed as the vehicle V, but the vehicle may be a ground vehicle or an industrial vehicle such as a forklift.

In the aforementioned embodiment, braking (deceleration of the vehicle V) using the service brake 50 as a main operator is performed in S15. However, when it is difficult to receive regenerative electric power using the battery 10 and the water electrolysis device 72, an electric heater that can consume regenerative electric power may be provided and the temperature of the battery 10 may be raised or a cabin may be heated using the electric heater.

In the flowchart illustrated in FIG. 2, the order of processing the steps may be appropriately changed and some steps may be skipped. For example, S16 may be skipped and S17 and S18 may be skipped. S11 and S12 may be skipped. S13 and S14 may be skipped.

The embodiment disclosed above is exemplary in all respects and is not restrictive. The scope of the present disclosure is defined by the appended claims and includes all modifications within the meaning and scope equivalent to the claims.

What is claimed is:

1. A vehicle comprising:

a power storage device;

a regenerative fuel cell including a water electrolysis device and a fuel cell;

a motor generator configured to be driven using electric power of at least one of the power storage device and the fuel cell;

a driving wheel configured to be driven by the motor generator; and a control device configured to perform regeneration control of generating regenerative electric power by the motor generator at a time of braking of the vehicle, wherein the control device is configured to supply the regenerative electric power to the water electrolysis device when an SOC of the power storage device is equal to or greater than a predetermined value at a time of performing the regeneration control, wherein the power storage device includes a lithium-ion battery, and wherein the control device is configured to charge the power storage device by supplying the regenerative electric power to the power storage device in a range of a charging current and to supply a remaining regenerative electric power to the water electrolysis device when the SOC of the power storage device is less than the predetermined value, the range of the charging current being a range in which lithium is not deposited in the lithium-ion battery due to charging with the regenerative electric power, the remaining regenerative electric power being the regenerative electric power which is not supplied to the power storage device.

2. The vehicle according to claim 1, wherein:

the regenerative fuel cell includes a hydrogen tank and an oxygen tank; and the control device is configured not to supply the regenerative electric power to the water electrolysis device when the hydrogen tank of the regenerative fuel cell is fully filled with hydrogen or when the oxygen tank of the regenerative fuel cell is fully filled with oxygen.

3. The vehicle according to claim 1, wherein the range in which lithium is not deposited in the lithium-ion battery is calculated using a magnitude of the charging current supplied to the power storage device, a charging time, and a temperature of the power storage device.

4. The vehicle according to claim 1, further comprising a temperature raising device configured to raise a temperature of the power storage device using waste heat of the regenerative fuel cell, wherein the control device is configured to operate the temperature raising device when the temperature of the power storage device is equal to or lower than a set temperature.

5. The vehicle according to claim 4, wherein the temperature raising device is a temperature-adjusting water passage including a water passage and a first heat exchanger.

6. The vehicle according to claim 5, wherein:

a coolant flows in the water passage;

the temperature raising device includes a second heat exchanger; and the coolant exchanges heat with the regenerative fuel cell at the first heat exchanger and exchanges heat with the power storage device at the second heat exchanger.

7. The vehicle according to claim 1, further comprising a photovoltaic power generation device, wherein the control device is configured to supply electric power generated by the photovoltaic power generation device to at least one of the power storage device and the water electrolysis device.

* * * * *